United States Patent [19]

Kiss

[11] Patent Number: 5,760,706
[45] Date of Patent: Jun. 2, 1998

[54] REMOTE CONTROL SYSTEM USING PARTIALLY EARTH-BURIED RF ANTENNA

[76] Inventor: Michael Z. Kiss, 418 S. Meadows Ave., Manhattan Beach, Calif. 90266

[21] Appl. No.: 615,730

[22] Filed: Mar. 14, 1996

Related U.S. Application Data

[63] Continuation of Ser. No. 145,875, Oct. 29, 1993, abandoned.

[51] Int. Cl.⁶ .................................................. G08C 17/02
[52] U.S. Cl. ......................... 340/825.69; 340/835.06;
340/835.72; 343/741; 343/848; 343/872;
343/719; 455/88; 455/352; 364/138
[58] Field of Search ........................ 340/825.06, 825.69,
340/825.72, 870.01; 343/702, 741, 829,
846, 848, 872, 719; 455/88, 90, 128, 347,
352, 500; 364/138

[56] References Cited

U.S. PATENT DOCUMENTS

| Re. 26,196 | 4/1967 | Boyer | 343/742 |
|---|---|---|---|
| 3,151,328 | 9/1964 | Boyer | 343/742 |
| 3,247,515 | 4/1966 | Bever | 343/742 |
| 4,366,486 | 12/1982 | Toulios | 343/846 |
| 4,573,115 | 2/1986 | Halgrimson | 340/825.06 X |
| 4,661,821 | 4/1987 | Smith | 343/872 X |
| 4,760,547 | 7/1988 | Duxbury | 239/69 |
| 4,809,010 | 2/1989 | Losee | 343/719 |
| 4,852,802 | 8/1989 | Iggulden et al. | 239/69 |
| 5,034,753 | 7/1991 | Weber | 343/846 |
| 5,074,468 | 12/1991 | Yamamoto et al. | 239/70 |
| 5,298,894 | 3/1994 | Cerny et al. | 340/870.01 |
| 5,333,785 | 8/1994 | Dodds et al. | 236/69 |

*Primary Examiner*—Michael Horabik
*Assistant Examiner*—William H. Wilson, Jr.
*Attorney, Agent, or Firm*—Freilich, Hornbaker & Rosen

[57] ABSTRACT

An RF control system characterized by the use of remotely located low profile radio frequency antennas which are concealed in conventionally appearing valve boxes or similar housings. The system includes a central control station, including a central RF transmitter, and a plurality of remote station, each including an RF receiver and antenna. A preferred remote station includes a valve box or similar housing of the type intended to be at least partially buried in the earth. The housing has a peripheral wall defining an access opening and a removable cover for bridging the opening. A directional discontinuity ring radiator (DDRR) antenna is physically mounted in the valve box housing on the interior side of the cover and is connected to a receiver, preferably also physically mounted on the cover.

16 Claims, 5 Drawing Sheets

REMOTE CONTROL SYSTEM USING PARTIALLY EARTH-BURIED RF ANTENNA

This is a continuation of application Ser. No. 08/145,875, filed Oct. 29, 1993, now abandoned.

FIELD OF THE INVENTION

This invention relates generally to radio frequency control systems suitable for use in large irrigation projects and the like for controlling remote devices such as solenoid valves.

BACKGROUND OF THE INVENTION

Various wireless systems exist which use radio frequency (RF) signals for controlling remote solenoid valves. For example, such systems are frequently used for irrigating golf courses, cemeteries, traffic medians, agricultural tracts, and for controlling waste treatment plants. Typical wireless RF systems employ visually conspicuous vertically polarized antennas which are prone to vandalism and, in many situations, are aesthetically displeasing.

Short height low radio frequency antennas have been described in U.S. Pat. Nos. 3,151,328; 3,247,515; and RE.26,196, all issued to J. M. Boyer, and in an article authored by J. M. Boyer entitled "Hula Hoop Antennas, A Coming Trend?", *Electronics*, Jan. 11, 1963. Such antennas, which are sometimes referred to as directional discontinuity ring radiators (DDRR), are characterized by at least one elongate conductive member forming a planar ring oriented in a substantially horizontal plane. In a typical configuration, as described in U.S. Pat. No. 3,151,328, the elongate conductive member comprises a nearly closed ring having a first end electrically connected directly to a common conductive plane and a second end connected to the common plane through a capacitive tuning means.

SUMMARY OF THE INVENTION

The present invention is directed to an improved RF control system characterized by the use of remotely located low profile radio frequency antennas which are preferably concealed in conventionally appearing valve boxes or similar housings.

A system in accordance with the present invention includes a central control station, including a central RF transmitter, and a plurality of remote stations, each including an RF receiver and antenna. A preferred remote station in accordance with the invention includes a valve box or similar housing of the type intended to be at least partially buried in the earth. The housing has a peripheral wall defining an access opening and a removable cover for bridging the opening. In accordance with a preferred embodiment of the invention, a DDRR antenna is physically mounted in the valve box housing on the interior side of the cover and is connected to a receiver, preferably also physically mounted on the cover.

In accordance with an important feature of the preferred embodiment, a solar cell is externally mounted on a panel which functions as the housing cover for charging a remote station battery.

A preferred irrigation system in accordance with the invention includes a central station transceiver and a plurality of remote station transceivers. In operation, the central station transceiver transmits an encoded RF command identifying one or more of the remote stations. An identified station responds to the command, e.g. activates it local solenoid valves, and additionally transmits information back to the central station bearing remote station status information, e.g., battery condition.

DETAILED DESCRIPTION

Figure 1:
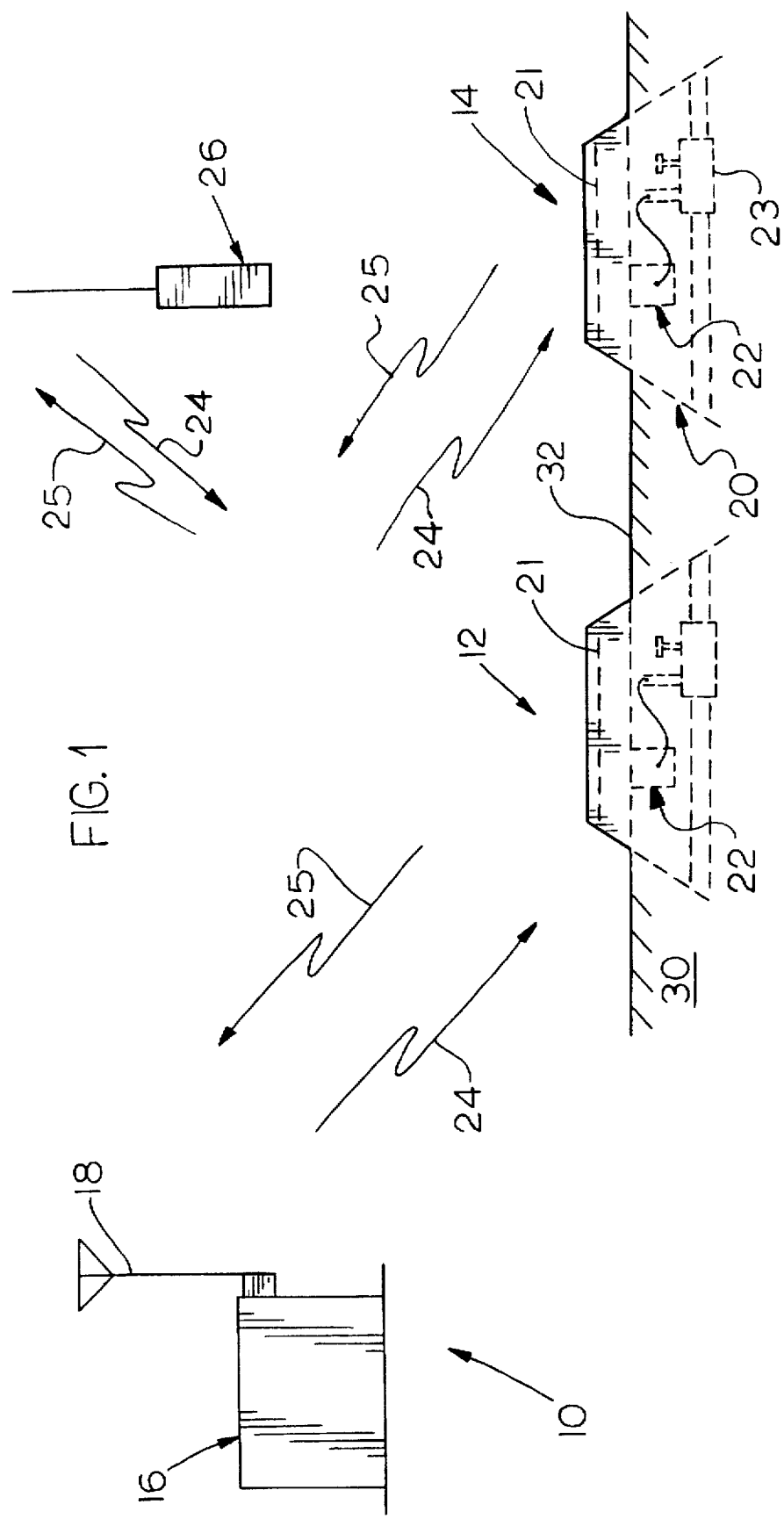
FIG. 1 is a schematic block diagram generally depicting a system in accordance with the present invention.
Figure 3:
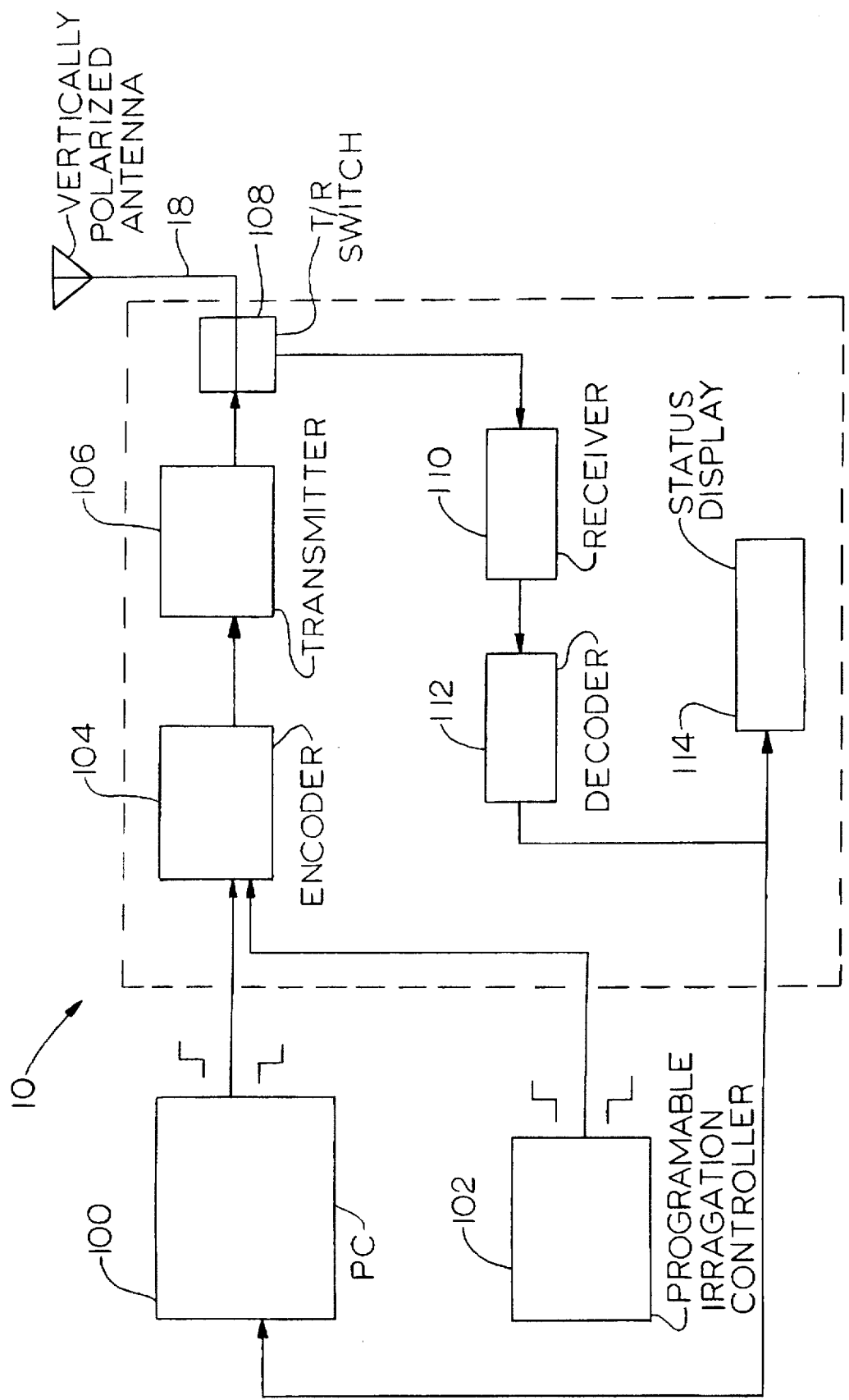
FIG. 3 is functional block diagram of the RF transceiver electronics in a preferred central station in accordance with the present invention.

Attention is now directed to FIG. 1 which generally depicts a radio frequency control system in accordance with the invention comprised of a central station 10 and one or more remote stations 12, 14. The central station 10, described in greater detail in connection with FIG. 3, is generally comprised of control and RF transceiver (i.e. transmitter and receiver) electronics 16 and a vertically polarized RF antenna 18. A typical remote station 14 in accordance with the invention is comprised of a partially buried valve box or similar housing 20 containing a low profile RF antenna 21, RF transceiver electronics 22, and a remote controllable device 23, e.g., solenoid valve, all to be discussed in greater detail in connection with FIG. 4.

In the operation of the system of FIG. 1, the central station 10 transmits RF signals from antenna 18 which are typically encoded with commands identifying particular remote stations and particular actions to be taken. The identified remote stations receive and decode the RF signals 24, take the commanded action (typically, a solenoid valve closure), and transmit a return RF signal 25 to the central station 10. The RF signals 25 transmitted by the remote stations are preferably encoded with acknowledgement information and/or status information, e.g. battery status. In an exemplary embodiment, the RF links, 24, 25 operate at approximately 27 megahertz.

In an exemplary application of the system of FIG. 1, as for example in a golf course irrigation system, the remote stations 12, 14 can be located up to several thousand feet away from the central station 10. To facilitate local control and trouble shooting of the system, it is preferable to also provide a portable control transceiver 26 which can be readily carried by an operator for locally replicating encoded RF signal transmissions from the central station 10.

Figure 2:
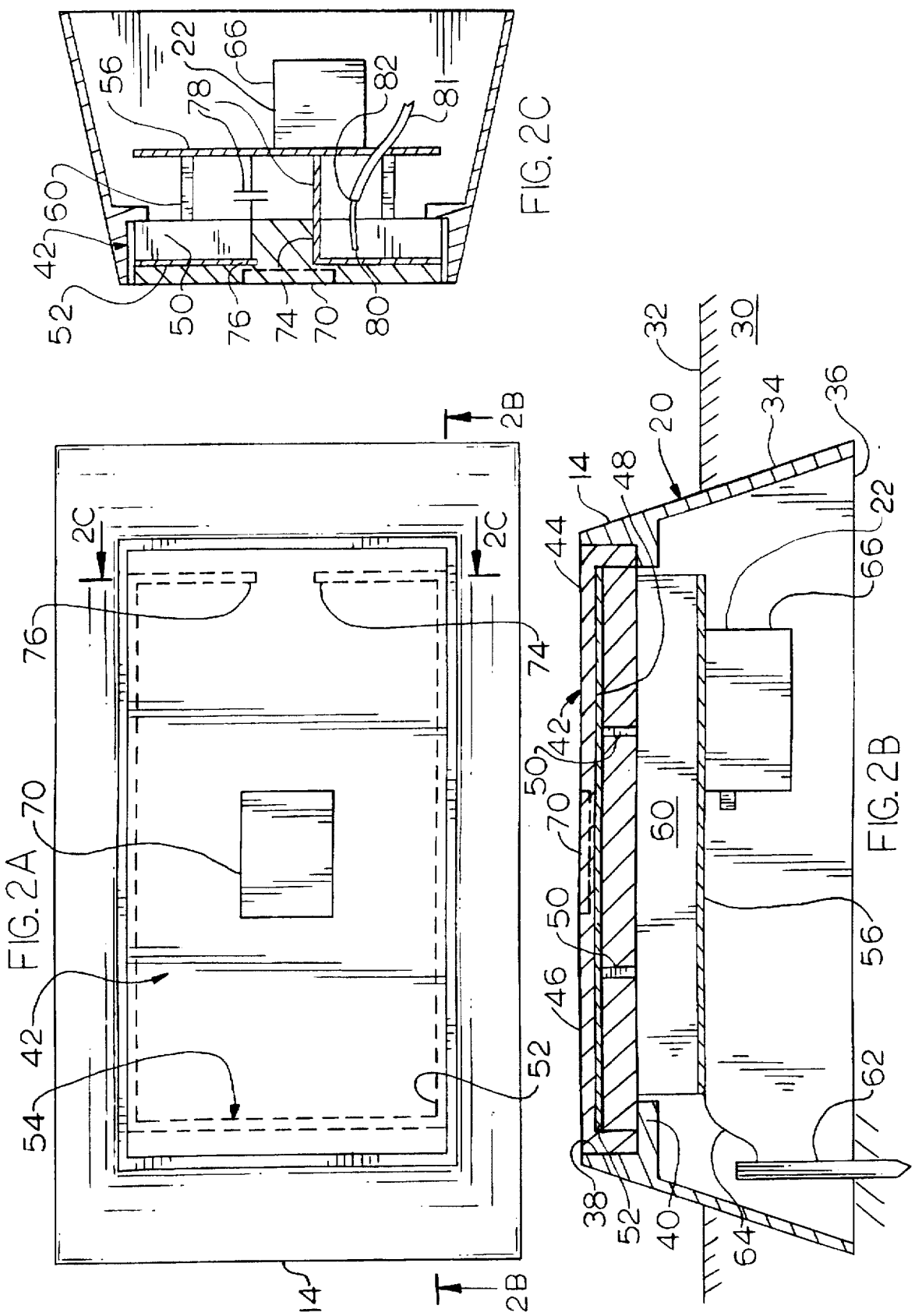
FIG. 2A is a plan view of a preferred valve box in accordance with the present invention.
FIG. 2B is a sectional view taken substantially along the plane 2B—2B of FIG. 2A.
FIG. 2C is sectional view taken substantially along the plane 2C—2C of FIG. 2A.

Attention is now directed to FIGS. 2A, 2B, and 2C which illustrate a preferred remote station 14, in accordance with the present invention. The remote station 14 is comprised of a substantially conventional valve box or similar housing 20 of the type intended to be at least partially buried in the earth 30 below ground surface 32. Such valve boxes are readily commercially available in various geometric shapes (e.g., circular, rectangular, etc) and sizes and materials (e.g., concrete, plastic, etc). Typically, such valve boxes are comprised of a peripheral wall 34 which is generally open at the bottom 36 to provide access for underground conduits. The peripheral wall 34 additionally defines a top access opening at 38 above an inwardly extending flange 40. A top cover 42 is provided which is shaped and dimensioned (e.g., approximately 13 by 20 inches) to fill the access opening 38 and rest on the flange 40. The cover 42 can either be removable or hinged relative to the peripheral wall 34 to provide access to the interior of the box 20 via the top access opening 38.

As illustrated, the cover 42 comprises an essentially flat panel 44 having an exterior surface 46 and an interior surface 48. Strengthening partitions 50 depend from the interior surface 48. In accordance with a preferred embodiment of the invention, a directional discontinuity ring radiator (DDRR) antenna is physically mounted on the panel 44 depending from the interior surface 48. The DDRR antenna 21 is comprised of an elongate conductive member 52 configured to define a planar ring 54. The elongate member 52 is physically mounted to the interior surface 48 of panel 44 so as to be oriented horizontally, as depicted in FIG. 2B, when the cover is positioned on an installed box 20.

A conductive planar member 56, forming a ground plane is physically suspended from the interior surface of panel 44 by a dielectric member 60. The ground plane member 56 is spaced from (e.g., about 3 inches) and oriented parallel to the elongate conductive member 52 defining the planar ring 54. As depicted in FIG. 2B, the housing 20 is preferably buried to a level whereat the ground plane member 56 is essentially aligned with the ground surface 32. A conductive ground stake 62 is preferably provided to electrically connect ground plane member 56 to an earth ground via flexible wire 64.

FIG. 2B also depicts an electronics box 66, containing transceiver and related electronics 22, which is physically suspended from the panel 44 beneath the ground plane member 56. The cover 42 is additionally provided with a solar cell 70 mounted on the exterior surface 46 of panel 44 for charging a battery (FIG. 4) for powering the transceiver electronics 22 and/or solenoid 23.

As is characteristic of DDRR antennas, the planar ring 54 formed by elongate conductive member 52 is nearly, but not completely, closed. Rather, conductive member 52 defines a first end 74 which is electrically connected directly to ground plane member 56. Further, the elongate conductive member defines a second end 76 which is connected to the ground plane member 56 via a tuning capacitor 78. RF energy is fed into or out of the antenna through a first connection 80 near the first end 74 of the conductive member 52. This RF energy is preferably carried by the center conductor of a coaxial cable 81 whose ground shield is connected at 82 to the ground plane member 56. A loading inductive coil (not shown) may be incorporated in the conductive member 52 proximate to the connection 80 to enhance performance at certain frequencies and dimensions.

Attention is now directed to FIG. 3 which depicts a functional block diagram of a preferred central station 10 in accordance with the present invention. Two operator controllable input sources are shown; namely, a personal computer 100 and a programmable controller 102, e.g. a commercially available irrigation controller. Computer 100 and controller 102 supply command to encoder 104 to encode RF signals produced by transmitter 106. The encoded RF signals are then applied to vertically polarized RF antenna 18 via a transmit/receive (T/R) switch 108. Signals received via the RF antenna 18 are applied to receiver 110 via T/R switch 108 and, after decoding by decoder 112, are supplied to computer 100 and a status display 114.

Figure 4:
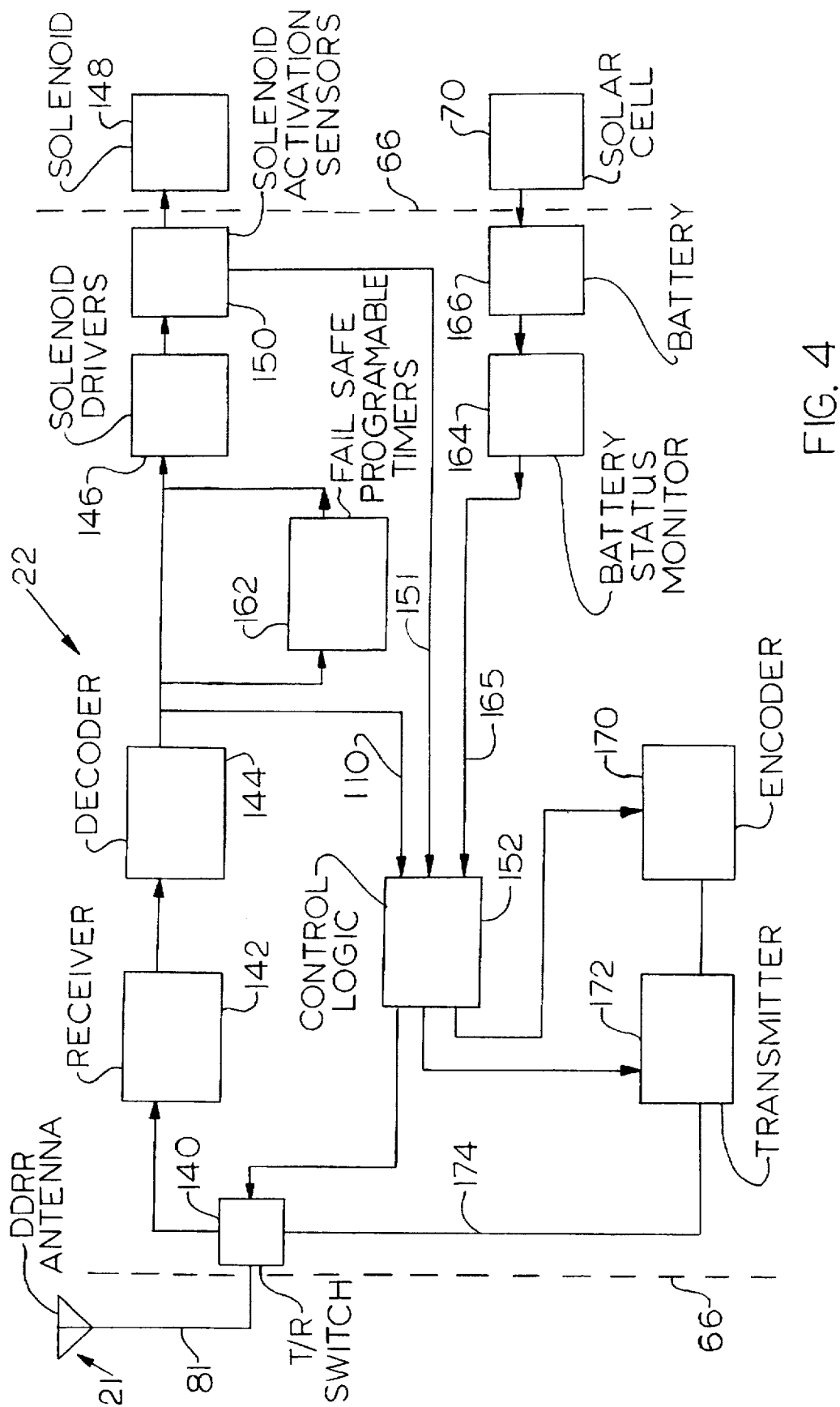
FIG. 4 is a functional block diagram of a preferred remote station in accordance with the present invention.

Attention is now directed to FIG. 4 which depicts a functional block diagram of the RF transceiver electronics 22 in a preferred remote station 14 in accordance with the present invention. The remote station DDRR antenna 21 is connected via aforementioned coaxial feed cable 81 to a T/R switch 140. The receive output of switch 140 is connected to receiver 142 whose output is provided to decoder 144. If the decoder 144 recognizes that a received command identifies its remote station, it sends an appropriate control signal to solenoid driver 146 to cause a solenoid 148 (which can be physically located in box 20 or remote therefrom) to take the commanded action, e.g., ON or OFF. A sensor 150 detects the activation status of the solenoid 148 and feeds back a signal via line 151 to control logic 152.

The output of decoder 144, in addition to operating solenoid driver 146, is also sent to control logic 152 via line 160. In addition, the output of decoder 144, when activating solenoid driver 146, initializes a fail safe programmable timer 162. The fail safe timer 162 can be set to a selected duration (e.g., 15 minutes to 17 hours) to assure that the solenoid 148 will be deactivated at a certain point in time, even if the receiver 142 and decoder 144 fail to receive an "OFF" signal via the RF link from the central station 10.

A third input to the control logic 152 is derived from a battery status monitor 164 via line 165 which monitors the status of battery 166 which is charged by aforementioned solar cell 70. The control logic 152 responds to the acknowledgement information (provided by line 160), the solenoid status information (provided by line 151), and the battery status information (provided by line 165) to encode, via encoder 170, the RF energy supplied by transmitter 172, via line 174 and T/R switch 140, to the DDRR antenna 21.

Figure 5:
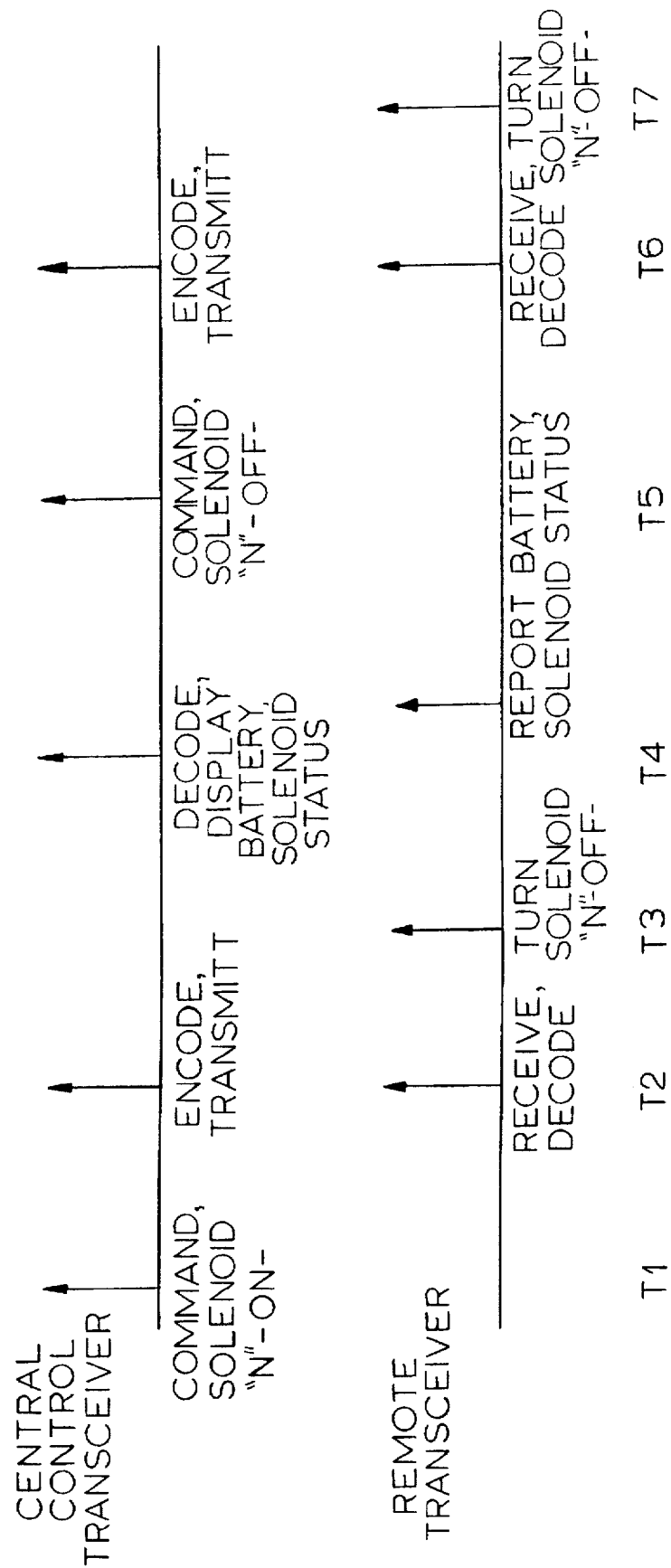
FIG. 5 is a timing chart depicting a typical operational sequence for a preferred system embodiment.

FIG. 5 is a timing chart which depicts a typical operational sequence of a system in accordance with the present invention. Note at time T1 the central control transceiver 16 generates a command "Solenoid N-ON-". At time T2, the command is transmitted from antenna 18 via RF signal 24 (FIG. 1) and received by a remote station DDRR antenna 21. The remote station decoder 144 decodes the signal and as a consequence solenoid N (148) is turned on at time T3. At time T4, the remote station transceiver reports its battery and solenoid status via transmitter 172 and DDRR antenna 21. This information is decoded by the central station decoder 112 and displayed by the computer 100 and status display 114. At time T5, the computer 100 or controller 102 issues a command to turn solenoid N off. This command is then transmitted by the central station transmitter 106 at time T6 and received and decoded by the remote station receiver 142 and decoder 144. At time T7, the solenoid is turned off.

From the foregoing, it should be apparent that an improved radio frequency control system has been disclosed herein which is characterized by remote stations using low profile DDRR antennas concealed in substantially conventional valve boxes. As a consequence, systems in accordance with the invention are considerably less prone to vandalism or aesthetic objections.

I claim:

1. In a system for controlling from a central station a device located at a remote station, the improvement comprising:

a valve box having a peripheral wall defining an access opening;

a panel configured for mounting on said wall to substantially bridge said opening, said panel having an interior surface facing into said valve box;

said valve box comprising a structure suitable for direct burial in the ground to position said panel substantially horizontally and slightly vertically above the surface of said ground proximate thereto; and a radio frequency antenna physically mounted on said panel adjacent said panel interior surface, said antenna including:
   an elongate electrically conductive member forming a planar ring supported from said panel proximate to said interior surface; and
   an electrically conductive ground plane member suspended from said panel spaced from said interior surface and essentially vertically aligned with said ground surface proximate thereto.

2. The system of claim 1 further including an enclosure containing an electronic circuit; and
   means supporting said enclosure beneath said panel interior surface.

3. The system of claim 1 further including a solar cell mounted proximate to said panel exterior surface and electrically connected to said electronic circuit.

4. A method for forming and positioning an antenna in a remote station for receiving vertically polarized RF signals, comprising the steps of:
   forming a remote station comprising a housing including a peripheral wall defining an upper access opening and a removable panel bridging said opening, said panel having interior and exterior surfaces;
   placing receive electronics for receiving said RF signals in said housing;
   positioning a vertically polarized RF antenna coupled to said receive electronics in said housing; said RF antenna comprising (1) a conductive ground plane member horizontally oriented in said housing and (2) an elongate conductive member mounted in said housing proximate to said panel interior surface defining a planar ring oriented parallel to and spaced above said ground plane member; and
   partially burying said housing in the earth such that said ground plane member is substantially aligned with the earth surface surrounding said housing and said elongate conductive member is positioned above the earth surface.

5. The method of claim 4 wherein said positioning step additionally includes physically mounting said elongate conductive member to said panel interior surface.

6. The method of claim 4 wherein said positioning step additionally includes suspending said ground plane member from said panel interior surface by a dielectric member at a spacing further from said panel interior surface than said elongate conductive member.

7. The method of claim 4 wherein said forming step additionally includes physically supporting said receive electronics from said panel interior surface.

8. A wireless control system comprising:
   a central station including a central RF transmitter, a vertically polarized central RF antenna functionally connected thereto, and a central encoding means for applying command information to RF signals produced by said central transmitter;
   at least one remote station including a vertically polarized remote RF antenna, a remote RF receiver functionally connected thereto, and a remote decoding means for decoding RF signals received by said remote receiver to produce decoded command information; and
   a controllable device located at said remote station responsive to said decoded command information;
   said remote station including a housing comprising a peripheral wall defining an upper access opening and a removable panel bridging said opening, said panel having interior and exterior surfaces, said housing being at least partially buried in the earth and positioned to orient said panel substantially horizontally with said interior surface spaced vertically above the proximate surface of the earth;
   said remote RF antenna comprising (1) a conductive ground plane member horizontally oriented in said housing and substantially vertically aligned with the proximate surface of the earth and (2) an elongate conductive member mounted in said housing proximate to said panel interior surface defining a planar ring oriented parallel to and spaced vertically above said ground plane member.

9. The system of claim 8 additionally comprising a central RF receiver functionally connected to said vertically polarized central RF antenna; and wherein
   said remote station further includes a remote RF transmitter functionally connected to said remote RF antenna and remote encoding means for applying command information to RF signals produced by said remote transmitter.

10. The system of claim 9 wherein said controllable device is responsive to said decoded command information for selectively switching from a first to a second state; and wherein
   said remote encoding means is responsive to information indicative of the state of said controllable device.

11. The system of claim 9 additionally comprising:
   a battery located at said remote station;
   a solar cell mounted on said panel exterior surface for charging said battery; and wherein
   said remote encoding means is responsive to information indicative of the charge status of said battery.

12. A centrally controlled wireless system for remotely operating a controllable device, said system comprising:
   a central station including:
      transmitter means for producing an RF signal;
      source means for producing command information;
      encoder means responsive to said command information for encoding said RF signal;
      a vertically polarized central antenna for broadcasting said encoded RF signal; and,
   at least one remote station including:
      a housing comprising a structure suitable for being at least partially buried in the earth and including a peripheral wall defining an upper access opening and a removable panel bridging said opening, said panel having interior and exterior surfaces;
      a vertically polarized remote antenna mounted in said housing for receiving said broadcast RF signal;
      decoder means mounted in said housing responsive to said received broadcast RF signal for producing decoded command information;
      a controllable device responsive to said decoded command information;
      said remote antenna including (1) a conductive ground plane member horizontally oriented in said housing and (2) an elongate conductive member mounted in said housing proximate to said panel interior surface defining a planar ring oriented parallel to and spaced vertically above said ground plane member; and wherein said housing is at least partially buried in the earth with said conductive ground plane member oriented substantially horizontally and positioned substantially in alignment with the surface of the earth proximate thereto.

13. The system of claim 12 wherein said remote station further includes transmitter means for producing a remote RF signal and means responsive to the state of said controllable device for encoding said remote RF signal and coupling said signal to said remote station antenna means for transmission to said central station; and wherein said central station further includes receiver means for receiving said remote RF signal transmitted from said remote station.

14. The system of claim 13 additionally comprising a solar cell mounted on said panel exterior surface for providing power to said decoder means.

15. The system of claim 14 additionally comprising battery means in said housing; and wherein said solar cell is coupled to said battery for charging said battery.

16. The system of claim 13 wherein said remote station additionally comprises transmitter means for producing a remote RF signal and means responsive to the charge state of said battery for encoding said remote RF signal for transmission to said central station; and wherein said central station additionally comprises receiver means for receiving said remote RF signal transmitted from said remote station.

\* \* \* \* \*